United States Patent [19]

Sun et al.

[11] Patent Number: 5,835,151

[45] Date of Patent: Nov. 10, 1998

[54] METHOD AND APPARATUS FOR DOWN-CONVERTING A DIGITAL SIGNAL

[75] Inventors: Huifang Sun, Cranbury; Jay Bao, Plainsboro; Tommy C. Poon, Murray Hill, all of N.J.

[73] Assignee: Mitsubishi Electric Information Technology Center America, Cambridge, Mass.

[21] Appl. No.: 648,358

[22] Filed: May 15, 1996

[51] Int. Cl.⁶ ...................................................... H04N 7/01
[52] U.S. Cl. ........................................... 348/441; 348/403
[58] Field of Search ..................................... 348/403, 408, 348/424, 392, 420, 441, 445, 458; 382/56

[56] References Cited

U.S. PATENT DOCUMENTS

| | | | |
|---|---|---|---|
| 5,050,230 | 9/1991 | Jones et al. ................................ | 382/56 |
| 5,253,043 | 10/1993 | Gibson ...................................... | 348/97 |
| 5,262,854 | 11/1993 | Ng ........................................... | 348/420 |
| 5,414,469 | 5/1995 | Gonzales et al. ........................ | 348/408 |
| 5,512,953 | 4/1996 | Nahumi ................................... | 348/441 |
| 5,555,097 | 9/1996 | Joung et al. ............................. | 348/445 |
| 5,585,851 | 12/1996 | Ebihara et al. .......................... | 348/392 |
| 5,614,957 | 3/1997 | Boyce et al. ............................ | 348/424 |

OTHER PUBLICATIONS

Huifan Sun et al.; "Hierarchical Decoder for MPEG Compressed Video Data"; *IEEE Transactions on Consumer Electronics*, vol. 39, No. 3, Aug. 1993; pp.559–564.

Jill Boyce et al.; "An SDTV Decoder with HDTV Capability"; pp. 1–12; SMPTE Fall Conf. New Orleans, 1995.

*Primary Examiner*—Brian Casler
*Assistant Examiner*—Luanne P. Din

[57] ABSTRACT

A method and apparatus for down-converting a digital video signal includes a synthesizer and a converter. The synthesizer receives a digital video signal including at least first and second DCT blocks of DCT coefficients, and synthesizes the first and second DCT blocks into a single synthesized DCT block having dimensions equal to the first and second DCT blocks. The converter converts the synthesized DCT block from the DCT domain to the spatial domain to produce an output digital video signal.

22 Claims, 3 Drawing Sheets

METHOD AND APPARATUS FOR DOWN-CONVERTING A DIGITAL SIGNAL

BACKGROUND OF THE INVENTION

1. Field of the Invention

The present invention relates to a method and apparatus for down-converting a digital signal.

2. Description of the Related Art

Digital video signal processing is an area of science and engineering that has developed rapidly over the past decade. The maturity of the Moving Picture Expert Group (MPEG) video coding standard represents a very important achievement for the video industry and provides strong support for digital transmission of video signals. With advancements in digital compression and other techniques such as digital modulation and packetization, as well as VLSI technology, the fundamentals of television have been reinvented for the digital age.

The first U.S. digital television transmission standard developed for broadcast of high and low definition television by a Grand Alliance of companies has been proposed to the Federal Communications Commission (FCC). High definition digital television broadcasts are typically referred to as HDTV, while low definition digital television broadcasts are generally referred to as SDTV. These terms will be used throughout this application, but are not tied to a particular format or standard. Instead, these terms are used to cover the high and low definition digital television of any coding standard (e.g., such as for VTRs and television).

In 1994 SDTV broadcasts became a reality when the first digital television services, broadcasted via satellite, went on the air. The Digital Satellite Service (DSS) units developed by Thomson Consumer Electronics, etc. have been distributed to more than 1 million homes. The highly sophisticated methods of transmitting and receiving digital television not only produce higher-quality television broadcasts, but also create new services, such as movies on demand, interactive programming, multimedia applications as well as telephone and computer services through the television.

Soon, HDTV will become a reality and join SDTV. Accordingly, in the near future, expect advanced television (ATV) broadcasts which include co-existent broadcasts of HDTV and SDTV. The problem, however, arises in that the HDTV signal can not be decoded by current SDTV decoders or NTSC decoders. (NTSC is the current analog broadcast standard in the U.S.) Several efforts have been reported to address this problem. U.S. Pat. No. 5,262,854 to S. Ng proposes a hierarchical decoder structure to provide a hierarchical representation of a decoded video sequence such that multiple video resolution can be reconstructed from the compressed MPEG bitstream. A modified version of this structure has been proposed by H. Sun, an inventor of the subject application, "Hierarchical Decoder for MPEG Compressed Video Data," IEEE Trans. on Consumer Electronics, August, 1993, Vol. 39, Number 3, pp. 559–562. Furthermore, a detailed investigation of an all-format ATV decoder has been reported by Jill Boyce, John Henderson and Larry Pearlstein, "An SDTV Decoder with HDTV Capability: An All-format ATV Decoder," SMPTE Fall Conference, New Orleans, 1995.

Conventionally, the spatial domain down-sizing in converting from HDTV to SDTV was achieved by cutting DCT domain coefficients and performing the inverse DCT with the remaining coefficients. First, the image is filtered by an anti-aliasing low pass filter. The filtered image is then down-sampled by a desired factor in each dimension. For the DCT based coded image (such as MPEG video coding) the conventional method requires converting the compressed image to the spatial domain by inverse DCT and then filtering and down-sampling or down-converting the inverse DCT. Alternatively, both the filtering and down-sampling operations are combined in the DCT domain by cutting frequencies and taking the inverse DCT with a lesser number of DCT coefficients.

When performing, for example, MPEG video encoding of HDTV, image blocks of 8×8 pixels in the spatial domain are converted into 8×8 DCT (discrete cosine transform) blocks of DCT coefficients in the DCT or frequency domain. Specifically, in most coding formats such as MPEG, the HDTV signal is divided into a luminance component (Y) and two chroma components (U) and (V). Furthermore, instead of U and V chroma blocks, some standards use color difference signal chroma blocks. For the purposes of discussion only, U and V chroma blocks will be used. Most formats such as MPEG specify different encoding sequences. In each encoding sequence a sequence header identifies the encoding sequence. Furthermore, in each encoding sequence, macro blocks of 8×8 DCT blocks of DCT coefficients are formed.

Encoding sequences for HDTV typically include the 4:2:0 encoding sequence, the 4:2:2 encoding sequence, and the 4:4:4 encoding sequence. In the 4:2:0 encoding sequence a macro block consists of four 8×8 luminance DCT blocks, one 8×8 U chroma DCT block, and one 8×8 V chroma DCT block. In the 4:2:2 encoding sequence a macro block consists of four 8×8 luminance DCT blocks, two 8×8 U chroma DCT blocks, and two 8×8 V chroma DCT blocks. Finally, in the 4:4:4 encoding sequence a macro block consists of four 8×8 luminance DCT blocks, four 8×8 U chroma DCT blocks, and four 8×8 V chroma DCT blocks. SDTV includes similar coding sequences, but the DCT blocks are 4×4 DCT blocks.

FIG. 1 illustrates a conventional apparatus for performing HDTV down-converting according to the conventional techniques discussed above wherein the filtering and down-sampling procedures are performed in the DCT domain. As shown in FIG. 1, a variable length decoder (VLD) and dequantizer 10 receives the HDTV bitstream generated, for example, according to MPEG video coding standards. The VLD and dequantizer 10 variable length decodes and dequantizes the HDTV signal in the well known manner. A down-converter 12, including a mask 14 and DCT inverter (IDCT) 16, down-converts the HDTV signal output by the VLD and dequantizer 10. The mask 14 masks the 8×8 blocks of DCT coefficients output by the VLD and dequantizer 10 to produce 4×4 blocks of DCT coefficients, thus, frequency cutting the 8×8 DCT blocks. The IDCT 16 takes the inverse DCT of the 4×4 DCT blocks and converts the 4×4 DCT blocks output by the mask 14 into 4×4 spatial blocks. Depending on the encoding scheme of the HDTV signal, the output of the IDCT 16 produces a bitstream in a corresponding SDTV sequence. For instance, the 4:2:0, 4:2:2 and 4:4:4 HDTV encoding sequences are down-converted to 4:2:0, 4:2:2 and 4:4:4 SDTV encoding sequences, respectively. An NTSC signal can be obtained from the SDTV signal using any well known conversion technique for that purpose.

As alluded to above, whether the output of the IDCT 16 produces a bitstream in SDTV format depends on the encoding scheme of the HDTV signal. Besides variable length encoding, MPEG provides for intra- and inter-coding. Intra-coding is where a field or frame of the HDTV signal, referred to as a picture, is encoded based on the pixels therein. Several well known techniques exist for intra-coding. An intra-coded picture is typically referred to as an I-picture. Consequently, the apparatus of FIG. 1 is capable of producing an SDTV signal when the HDTV signal includes only I-pictures.

Inter-coding, sometimes referred to as predictive encoding, is where a picture is encoded based on a reference picture, referred to as an anchor picture. In inter-coding, each macro block (i.e., related luminance and chroma blocks) of the picture being encoded is compared with the macro blocks of the anchor picture to find the macro block of the anchor picture providing the greatest correlation therewith. The vector between the two macro blocks is then determined as the motion vector. The inter-coded HDTV signal for the macro block being encoded will then include the motion vector and the differences between the macro block being encoded and the corresponding macro block of the anchor picture providing the greatest correlation.

For example, a series of pictures may have the display order $I_1B_1B_2P_1B_3B_4P_2B_5B_6P_3B_7B_8,_2$. . . The transmitted HDTV signal, however, will have the pictures arranged in the order of encoding as follows: $I_1P_1B_1B_2P_2B_3B_4P_3B_5B_6I_2B_7B_8$. P-pictures are encoded using the previous I-picture or P-picture as the anchor picture. In the above example, P-pictures $P_1$, $P_2$, and $P_3$ were encoded using I-picture $I_1$, P-picture $P_1$, and P-picture $P_2$, respectively, as the anchor picture.

The B-pictures may be forward encoded, backward encoded, or bi-directionally encoded. For instance, if B-picture $B_1$ was encoded using I-picture $I_1$ as the anchor picture, then B-picture $B_1$ is backward or back encoded. Alternatively, if B-picture $B_1$ was encoded using P-picture $P_1$ as the anchor picture, then B-picture $B_1$ is forward encoded. If B-picture $B_1$ was encoded using both I-picture $I_1$ and P-picture $P_1$ (typically an average thereof) as anchor pictures, then B-picture $B_1$ is bi-directionally encoded.

The headers in the HDTV signal indicate whether pictures are I, B, or P-pictures and the direction of encoding. These headers also indicate the group of picture (GOP) size N and the distance between anchor pictures M. The GOP size indicates the distance between I-pictures, which in the above example would be N=12. Since I-pictures and P-pictures are anchor pictures, the distance between anchor pictures in the above example would be M=3. Based on the information provided in the headers, the HDTV signal can be properly decoded.

Therefore, if inter-coding was used to encode a picture, the IDCT 16 outputs only the difference between the present picture and a previous picture. To produce a complete picture requires additional structure such as shown in FIG. 2.

In FIG. 2 the same reference numerals as in FIG. 1 have been used to designate like components. Accordingly, these components will not be described in detail. In FIG. 2, the output of the VLD and dequantizer 10 is also received by a motion vector detector 20. The motion vector detector 20 identifies the motion vectors for inter-coded pictures. Due to the down conversion operation of the down-converter 12, however, the motion vector detector 20 scales down the identified motion vectors by a factor of two. The motion vectors are then output to a frame store 22. The frame store 22 stores the two previous anchor pictures (e.g., I or P-pictures). The frame store 22 will then output the macro blocks of an anchor picture pointed to by the motion vectors. These macro blocks are received by an adder 18. The adder 18 also receives the output of the down-converter 12. Consequently, when a B or P-picture is being down converted, a complete picture can be obtained by adding the output of the down-converter 12, which represents the differences between the picture and an anchor picture, with the anchor picture to create a complete picture. When an I-picture is output from the down-converter 12, there is no need to add anchor picture information thereto, consequently the frame store 22 will not send output to the adder 18, and the output of the adder 18 will be the output of the down-converter 12.

The output of the adder 18 is received by a reformatter 24. The reformatter 24 is also connected to the frame store 22. Since the transmission, and therefore, reception order of the pictures is not in the proper display order, the reformatter 24 operates to reformat the order of the pictures into the proper display order.

To better understand the operation of the apparatus illustrated in FIG. 2, assume that an HDTV signal such as discussed above is received. Therefore, I-picture $I_1$ will be down converted by the down-converter 12 and output via adder 18 without any information having been added thereto. Since an I picture is an anchor picture, the frame store 22 will store the output of the adder 18. The reformatter 24 will then determine what output should be sent as the SDTV signal. The reformatter operates according the following rules: (1) if the picture received is the first anchor picture received then no output will be sent; (2) if the picture received is an anchor picture but not the first anchor picture received, then the previously received anchor picture will be output; and (3) if the picture received is a B-picture, then the B-picture will be immediately output.

Therefore, upon receipt of I-picture $I_1$, the reformatter 24 will not send any output. The next picture received will be P-picture $P_1$. The adder 18 will then receive the output of the down-converter 12 and macro blocks from the I-picture $I_1$ pointed to by the motion vectors detected by motion vector detector 20. Consequently, the adder 18 will generate a complete picture. Since this complete picture is an anchor picture, the frame store 22 will then store the complete picture $P_1$. According to the rules discussed above, the reformatter 24 will then output from the frame store 22 the I-picture $I_1$ (i.e., the previous anchor picture).

The next two pictures received are B-pictures $B_1$ and $B_2$. Complete pictures will be formed from these B-pictures in the same manner as discussed above with respect to P-picture $P_1$, except that, depending on the direction of encoding, either the I-picture $I_1$ and/or the P-picture $P_1$ will be used as the anchor picture. Since the adder 18 outputs a B-picture, the reformatter 24 will immediately output the B-picture. Consequently, the output from the reformatter 24 will be $I_1B_1B_2$.

Next, the P-picture $P_2$ is received and processed in the same manner as P-picture $P_1$. When the adder 18 outputs the complete P-picture $P_2$, the frame store 22 will replace the I-picture $I_1$ with the P-picture $P_2$. The reformatter 24, according to the rules discussed above, will then output the P-picture $P_1$. In this manner, the reformatter 24 will output the pictures in the proper display order.

In another technique, the 4×4 IDCT of FIG. 1 is replaced with an 8×8 IDCT. Accordingly, the 4×4 DCT blocks output by the mask 14 are padded with zeros to produce 8×8 DCT blocks. Then, after performing the 8×8 IDCT, each 8×8 spatial block is down-sampled in each dimension according to conventional techniques to produce 4×4 spatial blocks.

Unfortunately, the conventional conversion techniques such as discussed above with respect to FIGS. 1 and 2 produce SDTV signals having a significant amount of block edge effect and other distortions. Additionally, these conventional techniques do not offer high processing speeds.

SUMMARY OF THE INVENTION

An object of the present invention is to provide a method and apparatus for down-converting an HDTV signal into an SDTV or NTSC signal which performs filtering and down-sampling in the DCT domain.

Another object of the present invention is to provide a method and apparatus for down-converting an HDTV signal into an SDTV or NTSC signal which performs filtering and down-sampling in the DCT domain and reduces block edge effects and other distortions.

A further object of the present invention is to provide a method and apparatus for down-converting an HDTV signal into an SDTV or NTSC signal which performs filtering and down-sampling in the DCT domain and provides high processing speeds.

These and other objects are achieved by a method for down-converting a digital video signal which includes the steps of receiving the digital video signal including at least first and second DCT blocks of DCT coefficients; synthesizing the first and second DCT blocks into a single synthesized DCT block having dimensions equal to the first and second DCT blocks; and converting the synthesized DCT block from the DCT domain to the spatial domain to produce and output digital video signal.

These and other objects are further achieved by an apparatus for down-converting a digital video signal which includes synthesizing means for receiving the digital video signal including at least first and second DCT blocks of DCT coefficients, and for synthesizing the first and second DCT blocks into a single synthesized DCT block having dimensions equal to the first and second DCT blocks; and converting means for converting the synthesized DCT block from the DCT domain to the spatial domain to produce an output digital video signal.

As discussed above, the method and apparatus of the present invention does not utilize the conventional frequency cutting technique. Instead, the method and apparatus of the present invention employs a frequency synthesis technique which results in reduced block edge effects and other distortions, as well as, high processing speeds.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

DETAILED DESCRIPTION OF THE PREFERRED EMBODIMENTS

Figure 3:
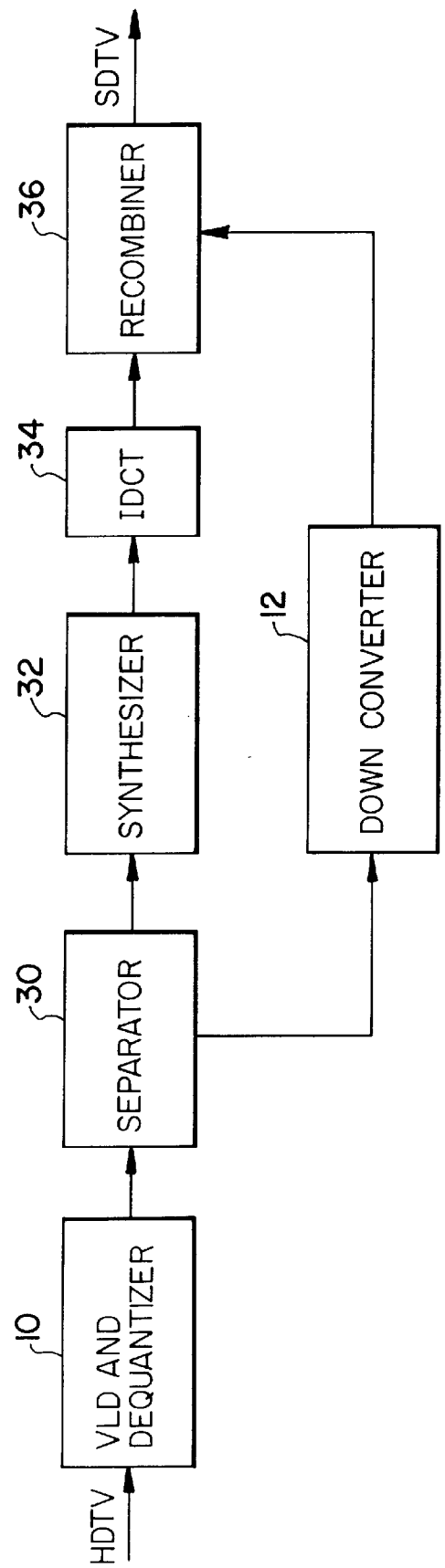
FIG. 3 illustrates an apparatus, according to the present invention, for performing HDTV down-converting wherein filtering and down-sampling are performed in the DCT domain.

FIG. 3 illustrates an apparatus, according to the present invention, for performing HDTV down-converting wherein filtering and down-sampling are performed in the DCT domain. As shown in FIG. 3, the apparatus includes VLD and dequantizer 10 such as described above which receives an HDTV signal of any particular format. For the purposes of discussion only, it will be assumed that the HDTV signal was encoded according to the 4:2:0 encoding sequence and includes U and V chroma DCT blocks. A separator 30 receives the output of the VLD and dequantizer 10, and separates the luminance DCT blocks from the V chroma DCT blocks and the U chroma DCT blocks. The luminance DCT blocks are output to a synthesizer 32, and the U and V chroma DCT blocks are output to a down-converter 12.

Figure 1:
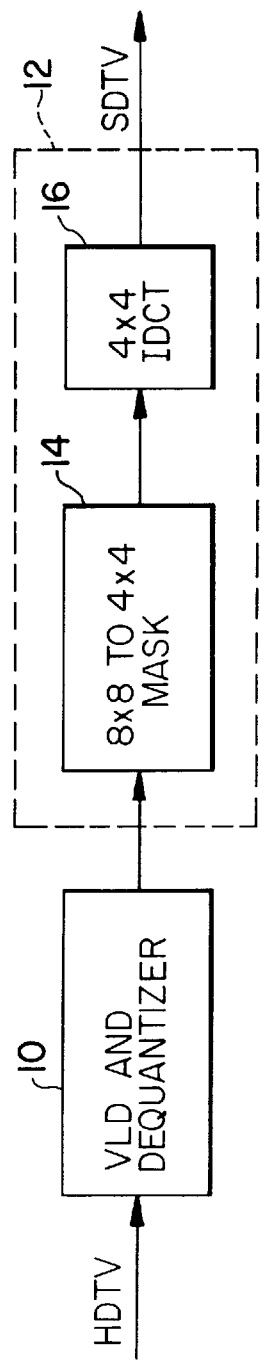
FIG. 1 illustrates a conventional apparatus for performing HDTV down-converting wherein filtering and down-sampling are performed in the DCT domain.

The down-converter 12 operates on the U and V chroma DCT blocks in the same manner as discussed above with respect to FIG. 1. The synthesizer 32 synthesizes the luminance DCT blocks. An IDCT 34 performs inverse DCT and converts the output of the synthesizer from the DCT or frequency domain into the spatial domain. A recombiner 36 receives the bit stream from the IDCT 34 and the down-converter 12, and recombines these two bit streams to obtain a bit stream in SDTV format.

Next, the operation of the HDTV converter according to the present invention illustrated in FIG. 3 will be described. The separator 30 receives the output of the VLD and dequantizer 10, and based on the sequence header, identifies the sequence of the HDTV signal. When the 4:2:0 sequence has been identified, the separator 30 sends the four 8×8 luminance DCT blocks to the synthesizer 32, and sends the 8×8 U chroma DCT block and the 8×8 V chroma DCT block to the down-converter 12. When the 4:2:2 sequence has been identified, the separator 30 sends the four 8×8 luminance DCT blocks to the synthesizer 32, and sends the two 8×8 U chroma DCT blocks and the two 8×8 V chroma DCT blocks to the down-converter 12. When, however, the separator identifies the 4:4:4 sequence, the separator sends the four 8×8. luminance DCT blocks, the four 8×8 U chroma DCT blocks, and the four 8×8 V chroma DCT blocks to the synthesizer 32.

The synthesizer 32 synthesizes four 8×8 DCT blocks into one 8×8 DCT block. Accordingly, when the synthesizer 32 receives four 8×8 luminance DCT blocks, the synthesizer outputs one 8×8 luminance DCT block. To better explain the operation of the synthesizer 32, the operating principal will first be described for a one-dimensional case, and then the two-dimensional approach used in the synthesizer 32 will be described. Two different techniques for performing the synthesis operation will also be described.

In the one-dimensional case, an 8 element array is obtained from two 8 element arrays (e.g., a 16 element array). Assume that $a_i$ (i=0, 1, . . . , 15) represents the 16 element array in the spatial domain, and two one-dimensional arrays in the spatial domain are defined as $b_i = a_i$; and $c_i = a_{i+8}$ (i=0, 1, . . . , 7). Expressions (1) and (2) represent one-dimensional 8 element arrays b and c as 8×1 DCT arrays B and C, respectively.

$$B_k = \frac{g(k)}{2} \sum_{i=0}^{7} b_i \cos\left(\frac{(2i+1)k\pi}{16}\right) \quad k = 0, 1, \ldots 7. \quad (1)$$

and $$C_k = \frac{g(k)}{2} \sum_{i=0}^{7} c_i \cos\left(\frac{(2i+1)k\pi}{16}\right) \quad k = 0, 1, \ldots 7. \quad (2)$$

where $g(k) = \begin{cases} \frac{1}{\sqrt{2}}, & \text{if } k = 0; \\ 1, & \text{otherwise.} \end{cases}$ In this one-dimensional case, the function of the frequency synthesis operation is to produce an 8×1 DCT array A' from the two one-dimensional 8×1 DCT arrays B and C. Accordingly, A' represented in the spatial domain as 8 element array a' can be defined in terms of 8×1 DCT arrays B and C, and/or 8 element arrays b and c. Expression (3) below shows the relationship between A' and a'.

$$A'_k = \frac{g(k)}{2} \sum_{i=0}^{7} a'_i \cos\left(\frac{(2i+1)k\pi}{16}\right) \quad k = 0, 1, \ldots 7. \quad (3)$$

The first synthesis technique involves an average smoothing and down-sampling operation. According to the average smoothing operation, a' is obtained from b and c using operators $S_b$ and $S_c$ as shown in expression (4).

$$a' = S_b b + S_c c \quad (4)$$

For example, expression (4) may take the form shown in expression (5) below; wherein $S_b$ and $S_c$ are both set to 0.50

$$a' = \begin{bmatrix} 0.5(b_0 + b_1) \\ 0.5(b_2 + b_3) \\ 0.5(b_4 + b_5) \\ 0.5(b_6 + b_7) \\ 0.5(c_0 + c_1) \\ 0.5(c_2 + c_3) \\ 0.5(c_4 + c_5) \\ 0.5(c_6 + c_7) \end{bmatrix} \quad (5)$$

In accordance with expression (5), the transformation of a' to A' in expression (3) can be represented as shown in expression (6) below.

$$A'_k = \frac{g(k)}{2} \sum_{i=0}^{7} a'_i \cos\frac{(2i+1)k\pi}{16} = \quad (6)$$

$$\frac{g(k)}{2} \left( \sum_{i=0}^{3} \frac{1}{2} (b_{2i} + b_{2i+1}) \cos\frac{(2i+1)k\pi}{16} + \sum_{i=4}^{7} \frac{1}{2} (c_{2(i-4)} + c_{2(i-4)+1}) \cos\frac{(2i+1)k\pi}{16} \right) =$$

$$\frac{g(k)}{4} \left( \sum_{i=0}^{3} \cos\frac{(2i+1)k\pi}{16} \left( \sum_{p=0}^{7} \frac{g(p)}{2} B_p \left( \cos\frac{(4i+1)p\pi}{16} + \cos\frac{(4i+3)p\pi}{16} \right) \right) + \sum_{i=4}^{7} \cos\frac{(2i+1)k\pi}{16} \left( \sum_{p=0}^{7} \frac{g(p)}{2} C_p \left( \cos\frac{(4(i-4)+1)p\pi}{16} + \cos\frac{(4(i-4)+3)p\pi}{16} \right) \right) \right) =$$

$$\sum_{p=0}^{7} B_p \left( \frac{g(k)g(p)}{8} \sum_{i=0}^{3} \cos\frac{(2i+1)k\pi}{16} \left( \cos\frac{(4i+1)p\pi}{16} + \cos\frac{(4i+3)p\pi}{16} \right) \right) +$$

$$\sum_{p=0}^{7} C_p \left( \frac{g(k)g(p)}{8} \sum_{i=4}^{7} \cos\frac{(2i+1)k\pi}{16} \left( \cos\frac{(4(i-4)+1)p\pi}{16} + \cos\frac{(4(i-4)+3)p\pi}{16} \right) \right) = \sum_{p=0}^{7} M_k(p) B_p + \sum_{p=0}^{7} N_k(p) C_p$$

where $M_k(p)$ and $N_k(p)$ are the matrices represented in expressions (7a) and (7b) below.

$$M_k(p) = \frac{g(k)g(p)}{8} \sum_{i=0}^{3} \cos\frac{(2i+1)k\pi}{16} \left( \cos\frac{(4i+1)p\pi}{16} + \cos\frac{(4i+3)p\pi}{16} \right) \quad (7a)$$

$$N_k(p) = \frac{g(k)g(p)}{8} \sum_{i=4}^{7} \cos\frac{(2i+1)k\pi}{16} \left( \cos\frac{(4(i-4)+1)p\pi}{16} + \cos\frac{(4(i-4)+3)p\pi}{16} \right) \quad (7b)$$

As one skilled in the art will readily note, matrices M and N do not include the DCT coefficients, and are thus independent therefrom. As expression (6) demonstrates, the 8×1 DCT array A' can be synthesized from the two 8×1 DCT arrays B and C. The 8 element array a' in the spatial domain can then be obtained by an inverse DCT transformation.

Depending on the desired synthesis characteristics, the smoothing an filtering operations can be modified by modifying $S_b$ and $S_c$ in expression (4), which results in changes to matrices M and N.

Having demonstrated the one-dimensional case, one skilled in the art can readily determine the expressions (8)–(15d) below to implement the two-dimensional case, wherein A" represents the synthesized 8×8 DCT block; a" represents the spatial transformation of A"; B, C, D, and E each represent one of the four 8×8 DCT blocks; and b, c, d, and e represent the spatial transformation of the 8×8 DCT blocks, respectively.

$$B_{kl} = \frac{g(k)g(l)}{4} \sum_{i=0}^{7} \sum_{j=0}^{7} b_{ij} \cos\frac{(2i+1)k\pi}{16} \cos\frac{(2j+1)l\pi}{16} \quad (8)$$

$$C_{kl} = \frac{g(k)g(l)}{4} \sum_{i=0}^{7} \sum_{j=0}^{7} c_{ij} \cos\frac{(2i+1)k\pi}{16} \cos\frac{(2j+1)l\pi}{16} \quad (9)$$

$$D_{kl} = \frac{g(k)g(l)}{4} \sum_{i=0}^{7} \sum_{j=0}^{7} d_{ij} \cos\frac{(2i+1)k\pi}{16} \cos\frac{(2j+1)l\pi}{16} \quad (10)$$

$$E_{kl} = \frac{g(k)g(l)}{4} \sum_{i=0}^{7} \sum_{j=0}^{7} e_{ij} \cos\frac{(2i+1)k\pi}{16} \cos\frac{(2j+1)l\pi}{16} \quad (11)$$

$$g(k) = g(l) = \begin{cases} 1/\sqrt{2}, & \text{if } l = k = 0; \\ 1, & \text{otherwise.} \end{cases} \qquad a'' = S_b b + S_c c + S_d d + S_e e \tag{12}$$

$$a''_i = \frac{1}{4} \begin{bmatrix} (b_{0,0} + b_{1,0} + b_{0,1} + b_{1,1}) & \ldots & (b_{0,6} + b_{1,6} + b_{0,7} + b_{1,7}) & (c_{0,0} + c_{1,0} + c_{0,1} + c_{1,1}) & \ldots & (c_{0,6} + c_{1,6} + c_{0,7} + c_{1,7}) \\ (b_{2,0} + b_{3,0} + b_{2,1} + b_{3,1}) & \ldots & (b_{2,6} + b_{3,6} + b_{2,7} + b_{3,7}) & (c_{2,0} + c_{3,0} + c_{2,1} + c_{3,1}) & \ldots & (c_{2,0} + c_{3,0} + c_{2,1} + c_{3,1}) \\ \vdots & & \vdots & \vdots & & \vdots \\ (b_{6,0} + b_{7,0} + b_{6,2} + b_{7,1}) & \ldots & (b_{6,6} + b_{7,6} + b_{6,7} + b_{7,7}) & (c_{6,0} + c_{7,0} + c_{6,2} + c_{7,1}) & \ldots & c_{6,6} + c_{7,6} + c_{6,7} + c_{7,7}) \\ (d_{0,0} + d_{1,0} + d_{0,1} + d_{1,1}) & \ldots & (d_{0,6} + d_{1,6} + d_{0,7} + d_{1,7}) & (e_{0,0} + e_{1,0} + e_{0,1} + e_{1,1}) & \ldots & (e_{0,6} + e_{1,6} + e_{0,7} + e_{1,7}) \\ (d_{2,0} + d_{3,0} + d_{2,1} + d_{3,1}) & \ldots & (d_{2,6} + d_{3,6} + d_{2,7} + d_{3,7}) & (e_{2,0} + e_{3,0} + e_{2,1} + e_{3,1}) & \ldots & (e_{2,0} + e_{3,0} + e_{2,1} + e_{3,2}) \\ \vdots & & \vdots & \vdots & & \vdots \\ (d_{6,0} + d_{7,0} + d_{6,2} + d_{7,1}) & \ldots & (d_{6,6} + d_{7,6} + d_{6,7} + d_{7,7}) & (e_{6,0} + e_{7,0} + e_{6,2} + e_{7,1}) & \ldots & e_{6,6} + e_{7,6} + e_{6,7} + e_{7,7}) \end{bmatrix} \tag{13}$$

where $S_b = S_c + S_d + S_e = 0.25$ $$A''_{kl} = \frac{g(k)g(l)}{4} \sum_{i=0}^{7} \sum_{i=0}^{7} a''_{ij} \cos\frac{(2i+1)k\pi}{32} \cos\frac{(2j+1)l\pi}{32} = \tag{14}$$

$$\frac{g(k)g(l)}{4} \sum_{i=0}^{3} \sum_{j=0}^{3} \frac{1}{4} (b_{2i,2j} + b_{2i+1,2j} + b_{2i,2j+1} + b_{2i+1,2j+1}) \cos\frac{(2i+1)k\pi}{32} \cos\frac{(2j+1)l\pi}{32} +$$

$$\sum_{i=4}^{7} \sum_{j=0}^{3} \frac{1}{4} (c_{2(i-4),2j} + c_{2(i-4)+1,2j} + c_{2(i-4),2j+1} + c_{2(i-4)+1,2j+1}) \cos\frac{(2i+1)k\pi}{32} \cos\frac{(2j+1)l\pi}{32} +$$

$$\sum_{i=0}^{3} \sum_{j=4}^{7} \frac{1}{4} (d_{2i,2(j-4)} + d_{2i+1,2(j-4)} + d_{2i,2(j-4)+1} + d_{2i+1,2(j-4)+1}) \cos\frac{(2i+1)k\pi}{32} \cos\frac{(2j+1)l\pi}{32} +$$

$$\sum_{i=4}^{7} \sum_{j=4}^{7} \frac{1}{4} (e_{2(i-4),(j-4)} + e_{2(i-4)+1,2(j-4)} + e_{2(i-4),2(j-4)+1} + e_{2(i-4)+1,2(j-4)+1}) \cos\frac{(2i+1)k\pi}{32} \cos\frac{(2j+1)l\pi}{32} =$$

$$\frac{g(k)g(l)}{4} \left( \sum_{i=0}^{3} \sum_{j=0}^{3} \frac{1}{4} \left( \sum_{p=0}^{7} \sum_{q=0}^{7} \frac{g(p)g(q)}{4} B_{pq} \left( \cos\frac{(4i+1)p\pi}{32} \cos\frac{(4j-15)q\pi}{32} + \right. \right. \right.$$

$$\left. \cos\frac{(4i+3)p\pi}{32} \cos\frac{(4j+3)q\pi}{32} + \cos\frac{(4i+1)p\pi}{32} \cos\frac{(4j+3)q\pi}{32} + \cos\frac{(4i+3)p\pi}{32} \cos\frac{(4j+3)q\pi}{32} \right) +$$

$$\sum_{i=4}^{7} \sum_{j=0}^{3} \frac{1}{4} \left( \sum_{p=0}^{7} \sum_{q=0}^{7} \frac{g(p)g(q)}{4} C_{pq} \left( \cos\frac{(4i-15)p\pi}{32} \cos\frac{(4j+1)q\pi}{32} + \right. \right.$$

$$\left. \cos\frac{(4i-13)p\pi}{32} \cos\frac{(4j+3)q\pi}{32} + \cos\frac{(4i-15)p\pi}{32} \cos\frac{(4j+3)q\pi}{32} + \cos\frac{(4i-13)p\pi}{32} \cos\frac{(4j+3)q\pi}{32} \right) +$$

$$\sum_{i=0}^{3} \sum_{j=4}^{7} \frac{1}{4} \left( \sum_{p=0}^{7} \sum_{q=0}^{7} \frac{(g(p)g(q)}{4} D_{pq} \left( \cos\frac{(4i+1)p\pi}{32} \cos\frac{(4j-15)q\pi}{32} + \right. \right.$$

$$\left. \cos\frac{(4i+3)p\pi}{32} \cos\frac{(4j-15)q\pi}{32} + \cos\frac{(4i+3)p\pi}{32} \cos\frac{(4j-13)q\pi}{32} \right) +$$

$$\sum_{i=4}^{7} \sum_{j=4}^{7} \frac{1}{4} \left( \sum_{p=0}^{7} \sum_{q=0}^{7} \frac{g(p)g(q)}{4} E_{pq} \left( \cos\frac{(4i-15)p\pi}{32} \cos\frac{(4j-13)q\pi}{32} + \cos\frac{(4i-13)p\pi}{32} \cos\frac{(4j-15)q\pi}{32} + \right. \right.$$

$$\left. \left. \cos\frac{(4i-15)p\pi}{32} \cos\frac{(4j-13)q\pi}{32} + \cos\frac{(4i-13)p\pi}{32} \cos\frac{(4j-13)q\pi}{32} \right) \right) \cos\frac{(2i+1)k\pi}{32} \cos\frac{(2j+1)l\pi}{32} =$$

$$\sum_{p=0}^{7} \sum_{q=0}^{7} \frac{1}{4} [W_{kl}(p,q)B_{pq} + X_{kl}(p,q)C_{pq} + Y_{kl}(p,q)D_{pq} + Z_{kl}(p,q)E_{pq}]$$

where $$W_{kl}(p, q) = \tag{15a}$$

$$\frac{g(k)g(l)g(p)g(q)}{16} \sum_{i=0}^{3} \sum_{j=0}^{3} \left[ \cos\frac{(4i+1)p\pi}{32} \cos\frac{(4j+1)q\pi}{32} + \right.$$

$$\cos\frac{(4i+3)p\pi}{32} \cos\frac{(4j+1)q\pi}{32} +$$

$$\left. \cos\frac{(4i+1)p\pi}{32} \cos\frac{(4j+3)q\pi}{32} \right]$$

$$X_{kl}(p, q) = \frac{g(k)g(l)g(p)g(q)}{16} \cdot \tag{15b}$$

$$\sum_{i=4}^{7} \sum_{j=0}^{3} \left[ \cos\frac{(4i-15)p\pi}{32} \cos\frac{(4j+1)q\pi}{32} + \right.$$

$$\cos\frac{(4i-13)p\pi}{32} \cos\frac{(4j+1)q\pi}{32} +$$

$$\cos\frac{(4i-15)p\pi}{32} \cos\frac{(4j+3)q\pi}{32} +$$

$$\left. \cos\frac{(4i-13)p\pi}{32} \cos\frac{(4j+3)q\pi}{32} \right]$$

$$Y_{kl}(p, q) = \frac{g(k)g(l)g(p)g(q)}{16} \cdot \tag{15c}$$

$$\sum_{i=0}^{3} \sum_{j=4}^{7} \left[ \cos\frac{(4i+1)p\pi}{32} \cos\frac{(4j-15)q\pi}{32} + \right.$$

$$\cos\frac{(4i+3)p\pi}{32} \cos\frac{(4j-15)q\pi}{32} +$$

$$\cos\frac{(4i+1)p\pi}{32} \cos\frac{(4j-13)q\pi}{32} +$$

$$\left. \cos\frac{(4i+3)p\pi}{32} \cos\frac{(4j-13)q\pi}{32} \right]$$

$$Z_{kl}(p, q) = \frac{g(k)g(l)g(p)g(q)}{16} \cdot \tag{15d}$$

$$\sum_{i=4}^{7} \sum_{j=4}^{7} \left[ \cos\frac{(4i-15)p\pi}{32} \cos\frac{(4j-15)q\pi}{32} + \right.$$

$$\cos\frac{(4i-13)p\pi}{32} \cos\frac{(4j-15)q\pi}{32} +$$

$$\cos\frac{(4i-15)p\pi}{32} \cos\frac{(4j-13)q\pi}{32} +$$

$$\left. \cos\frac{(4i-13)p\pi}{32} \cos\frac{(4j-13)q\pi}{32} \right]$$

In the expressions above for the two-dimensional case, expressions (8)–(11), (12), (13), (14), and (15a)–(15d) correspond to expressions (1)–(2), (4), (5), (6) and (7a)–(7b) for the one-dimensional case. Therefore, as discussed above with the one-dimensional case, matrices W, X, Y and Z are independent of the DCT coefficients, and the smoothing and filtering operation can be modified by modifying Sb, Sc, Sd and Se in expression (12), which results in changes to matrices W, X, Y and Z.

The second technique involves low-pass filtering and smoothing. In this technique, an ideal low-pass filter, serving as an anti-aliasing filter, removes high-frequencies before down-sampling. The process of ideal low-pass filtering is equivalent to the convolution of the input array with a sin function in the spatial domain. Again, using a to designate a 16 element array, the one-dimensional case will be described. A 16×1 DCT array A is obtained from a using expression (16) below.

$$A_k = \frac{g(k)}{2} \sum_{k=0}^{15} a_k \cos\frac{(2i+1)k\pi}{32} \quad k = 0, 1, \ldots, 15. \tag{16}$$

Implementing ideal low-pass filtering, an 8×1 DCT array A' is obtained according to expression (17) below.

$$A'_k = A_k, \ k=0,1,\ldots,7 \tag{17}$$

Next, to obtain synthesis, A' must be characterized in terms of B and C. Expression (18) shows the relationship between A' and 8 element arrays b and c for even coefficients of A'.

$$A'_{2k} = \frac{g(k)}{2} \sum_{i=0}^{15} a_i \cos\left(\frac{(2i+1)2k\pi}{32}\right) = \tag{18}$$

$$\frac{g(k)}{2} \left( \sum_{i=0}^{7} a_i \cos\left(\frac{(2i+1)k\pi}{16}\right) + \right.$$

$$\left. \sum_{i=0}^{7} a_{i+8} \cos\left(\frac{(2(i+8)+1)k\pi}{16}\right) \right) =$$

$$\frac{g(k)}{2} \left( \sum_{i=0}^{7} b_i \cos\left(\frac{(2i+1)k\pi}{16}\right) + \right.$$

$$\left. (-1)^k \sum_{i=0}^{7} c_i \cos\left(\frac{(2i+1)k\pi}{16}\right) \right), \quad k = 0, 1, \ldots 3.$$

From expressions (18), (1) and (2), expression (19) is obtained.

$$A''_{2k} = B_k + (-1)^k C_k \ k=0,1,\ldots 3, \tag{19}$$

Expression (20) shows the relationship between A' and 8 element arrays b and c for odd coefficients of A'.

$$A'_{2k+1} = \frac{g(k)}{2} \left( \sum_{i=0}^{7} b_i \cos\frac{(2i+1)\left(k+\frac{1}{2}\right)\pi}{16} + \right. \tag{20}$$

$$\left. (-1)^k \sum_{i=0}^{7} c_i \cos\frac{(2i+1)\left(k+\frac{1}{2}\right)\pi}{16} + \left(k+\frac{1}{2}\right)\pi \right) =$$

$$\frac{g(k)}{2} \left( \sum_{i=0}^{7} b_i \cos\left(\frac{(2i+1)\left(k+\frac{1}{2}\right)\pi}{16}\right) + \right.$$

$$\left. (-1)^k \sum_{i=0}^{7} c_i \sin\left(\frac{(2i+1)\left(k+\frac{1}{2}\right)\pi}{16}\right) \right), \quad k = 0, 1, \ldots, 3.$$

Unfortunately, the odd coefficients can not be reduced to a simple expression as with the even coefficients. Accordingly, a matrix operation is required to express the odd coefficients of A' in terms of 8×1 matrices B and C. Expressions (21) and (22a)–(22b) below shows the relationship between the odd coefficients of A' and 8×1 matrices B and C.

$$A'_{2k+1} = \frac{g(k)}{2} \left( \sum_{i=0}^{7} \cos\frac{(2i+1)\left(k+\frac{1}{2}\right)\pi}{16} \left( \sum_{p=0}^{7} \frac{g(p)}{2} B_p \cos\frac{(2i+1)p\pi}{16} \right) + \right.$$

$$\left. (-1)^k \left( \sum_{i=0}^{7} \sin\frac{(2i+1)\left(k+\frac{1}{2}\right)\pi}{16} \left( \sum_{p=0}^{7} \frac{g(p)}{2} C_p \cos\frac{(2i+1)p\pi}{16} \right) \right) \right) = \quad (21)$$

$$\sum_{p=0}^{7} B_p \left( \frac{g(k)g(p)}{4} \sum_{i=0}^{7} \cos\frac{(2i+1)p\pi}{16} \cos\frac{(2i+1)\left(k+\frac{1}{2}\right)\pi}{16} \right) +$$

$$(-1)^k \sum_{p=0}^{7} C_p \left( \frac{g(k)g(p)}{4} \sum_{i=0}^{7} \cos\frac{(2i+1)p\pi}{16} \sin\frac{(2i+1)\left(k+\frac{1}{2}\right)\pi}{16} \right) =$$

$$\sum_{p=0}^{7} B_p U_k(p) + (-1)^k \sum_{p=0}^{7} C_p V_k(p), \quad k = 0, 1, \ldots, 3.$$

where $U_k(p)$ and $V_k(p)$ are the conversion matrices with:

$$U_k(p) = \frac{g(k)g(p)}{4} \sum_{i=0}^{7} \cos\frac{(2i+1)p\pi}{16} \cos\frac{(2i+1)\left(k+\frac{1}{2}\right)\pi}{16}, \quad (22a)$$

$k = 0, 1, \ldots 3.$ $$V_k(p) = \frac{g(k)g(p)}{4} \sum_{i=0}^{7} \cos\frac{(2i+1)p\pi}{16} \sin\frac{(2i+1)\left(k+\frac{1}{2}\right)\pi}{16}, \quad (22b)$$

$k = 0, 1, \ldots 3.$

As with matrices M and N in the first technique, matrices U and V are independent from the DCT coefficients.

Based on expressions (19) and (21), the synthesized 8×1 DCT array A' can be obtained. Then, the spatial domain representation of A', a', can be obtained by inverse DCT.

As with the first technique, having demonstrated the one-dimensional case for the second technique, one skilled in the art can readily determine expressions (23)–(26d) below to implement the two-dimensional case of the second technique, A" represents the synthesized 8×8 DCT block; a" represents the spatial transformation of A"; B, C, D, and E each represent one of the four 8×8 DCT blocks; and b, c, d, and 3 represent the spatial transformation of the 8×8 DCT blocks, respectively.

$$A''_{2k,2l} = \frac{g(k)g(l)}{4} \sum_{i=0}^{15} \sum_{j=0}^{15} a_{ij} \cos\frac{(2i+1)2k\pi}{32} \cos\frac{(2j+1)2l\pi}{32} = \quad (23)$$

$$\frac{g(k)g(l)}{4} \left( \sum_{i=0}^{7} \sum_{j=0}^{7} a_{ij} \cos\frac{(2i+1)k\pi}{32} \cos\frac{(2j+1)l\pi}{16} + \sum_{i=0}^{7} \sum_{j=0}^{7} a_{i+8,j} \cos\frac{(2i+8+1)k\pi}{16} \cos\frac{(2j+1)l\pi}{16} + \right.$$

$$\left. \sum_{i=0}^{7} \sum_{j=0}^{7} a_{i,j+8} \cos\frac{(2i+1)k\pi}{16} \cos\frac{(2j+8+1)l\pi}{16} + \sum_{i=0}^{7} \sum_{j=0}^{7} a_{i+8,j+8} \cos\frac{(2i+8+1)k\pi}{16} \cos\frac{(2j+8+1)l\pi}{16} \right) =$$

$$\frac{g(k)g(l)}{4} \left( \sum_{i=0}^{7} \sum_{j=0}^{7} b_{ij} \cos\frac{(2i+1)k\pi}{16} \cos\frac{(2j+1)l\pi}{16} + (-1)^k \sum_{i=0}^{7} \sum_{j=0}^{7} C_{ij} \cos\frac{(2i+1)k\pi}{16} \cos\frac{(2j+1)l\pi}{16} + \right.$$

$$\left. (-1)^l \sum_{i=0}^{7} \sum_{j=0}^{7} d_{ij} \cos\frac{(2i+1)k\pi}{16} \cos\frac{(2j+1)l\pi}{16} + (-1)^{k+l} \sum_{i=0}^{7} \sum_{j=0}^{7} e_{ij} \cos\frac{(2i+1)k\pi}{16} \cos\frac{(2j+1)k\pi}{16} \right) =$$

$$B_{ij} + (-1)^k C_{ij} + (-1)^l D_{ij} + (-1)^{k+l} E_{ij}$$

$$A''_{2k+1,2l+1} = \frac{g(k)g(l)}{4} \left( \sum_{i=0}^{7} \sum_{j=0}^{7} b_{ij} \cos\frac{(2i+1)k\pi}{16} \cos\frac{(2j+1)l\pi}{16} + \right. \quad (24)$$

$$(-1)^k \sum_{i=0}^{7} \sum_{j=0}^{7} c_{ij} \cos\left( \frac{(2i+1)\left(k+\frac{1}{2}\right)\pi}{16} + \left(k+\frac{1}{2}\right)\pi \right) \cdot \cos\left( \frac{(2i+1)\left(l+\frac{1}{2}\right)\pi}{16} + \left(l+\frac{1}{2}\right)\pi \right) +$$

$$(-1)^l \sum_{i=0}^{7} \sum_{j=0}^{7} d_{ij} \cos\left( \frac{(2i+1)\left(k+\frac{1}{2}\right)\pi}{16} + \left(k+\frac{1}{2}\right)\pi \right) \cdot \cos\left( \frac{(2j+1)\left(l+\frac{1}{2}\right)\pi}{16} + \left(l+\frac{1}{2}\right)\pi \right) +$$

$$(-1)^{k+l} \sum_{i=0}^{7} \sum_{j=0}^{7} e_{ij} \cos\left(\frac{(2i+1)\left(k+\frac{1}{2}\right)\pi}{16} + \left(k+\frac{1}{2}\right)\pi\right) \cdot \cos\left(\frac{(2j+1)\left(l+\frac{1}{2}\right)\pi}{16} + \left(l+\frac{1}{2}\right)\pi\right) =$$

$$\frac{g(k)g(l)}{4} \sum_{i=0}^{7} \sum_{j=0}^{7} \left( b_{ij} \cos\frac{(2i+1)\left(k+\frac{1}{2}\right)\pi}{16} \cos\frac{(2j+1)\left(l+\frac{1}{2}\right)\pi}{16} + \right.$$

$$(-1)^k c_{ij} \sin\frac{(2i+1)\left(k+\frac{1}{2}\right)\pi}{16} \sin\frac{(2i+1)\left(l+\frac{1}{2}\right)\pi}{16} + (-1)^l d_{ij} \cos\frac{(2i+1)\left(k+\frac{1}{2}\right)\pi}{16} \cos\frac{(2j+1)\left(l+\frac{1}{2}\right)\pi}{16} +$$

$$\left. (-1)^{k+l} e_{ij} \sin\frac{(2i+1)\left(k+\frac{1}{2}\right)\pi}{16} \sin\frac{(2j+1)\left(l+\frac{1}{2}\right)\pi}{16} \right)$$

$$A''_{2k+1,2l+1} = \sum_{p=0}^{7} \sum_{q=0}^{7} \frac{1}{4} [Q_{kl}(p,q)B_{pq} + (-1)^k R_{kl}(p,q)C_{pq} + (-1)^l S_{kl}(p,q)D_{pq} + (-1)^{k+l} T_{kl}(p,q)E_{pq}] \quad (25)$$

where $$Q_{kl}(p, q) = \quad (26a)$$
$$\frac{g(k)g(l)g(p)g(q)}{8} \sum_{i=0}^{7} \sum_{j=0}^{7} \cos\frac{(2i+1)p\pi}{16} \cos\frac{(2j+1)q\pi}{16} \cdot \cos\frac{(2i+1)\left(k+\frac{1}{2}\right)\pi}{16} \cos\frac{(2j+1)\left(l+\frac{1}{2}\right)\pi}{16}$$

$$R_{kl}(p, q) = \quad (26b)$$
$$\frac{g(k)g(l)g(p)g(q)}{8} \sum_{i=0}^{7} \sum_{j=0}^{7} \cos\frac{(2i+1)p\pi}{16} \cos\frac{(2j+1)q\pi}{16} \cdot \sin\frac{(2i+1)\left(k+\frac{1}{2}\right)\pi}{16} \sin\frac{(2j+1)\left(l+\frac{1}{2}\right)\pi}{16}$$

$$S_{kl}(p, q) = \quad (26c)$$
$$\frac{g(k)g(l)g(p)g(q)}{8} \sum_{i=0}^{7} \sum_{j=0}^{7} \cos\frac{(2l+1)p\pi}{16} \cos\frac{(2j+1)q\pi}{16} \cdot \cos\frac{(2i+1)\left(k+\frac{1}{2}\right)\pi}{16} \cos\frac{(2j+1)\left(l+\frac{1}{2}\right)\pi}{16}$$

$$T_{kl}(p, q) = \quad (26d)$$
$$\frac{g(k)g(l)g(p)g(q)}{8} \sum_{i=0}^{7} \sum_{j=0}^{7} \cos\frac{(2l+1)p\pi}{16} \cos\frac{(2j+1)q\pi}{16} \cdot \sin\frac{(2i+1)\left(k+\frac{1}{2}\right)\pi}{16} \sin\frac{(2j+1)\left(l+\frac{1}{2}\right)\pi}{16}$$

In the expressions above for the two-dimensional case, expressions (23)–(26d) correspond to expressions (19)–(22b) for the one-dimensional case. Therefore, as discussed above with the one-dimensional case, matrices Q, R, S, and T are independent of the DCT coefficients.

Accordingly, using either expressions (14)–(15d) according to the first technique or expressions (21)–(26d) according to the second technique, the synthesizer 32 synthesizes the four 8×8 luminance DCT blocks into a single 8×8 luminance DCT block.

When the separator 30 identifies either the 4:2:1 or the 4:2:2 sequence, the synthesizer 32 synthesizes the four 8×8 luminance DCT blocks into one 8×8 luminance DCT block according to one of the two techniques discussed above. If, however, the separator 30 identifies the 4:4:4 sequence, the synthesizer 32 synthesizes the four 8×8 luminance DCT blocks into one 8×8 luminance DCT block, synthesizes the four 8×8 U chroma DCT blocks into one 8×8 U chroma DCT block, and synthesizes the four 8×8 V chroma DCT blocks into one 8×8 V chroma DCT block. The IDCT 34 converts the DCT blocks output from the synthesizer 32 into spatial blocks.

During the synthesis operation, the down-converter 12 receives the output of the separator 30 as discussed above, and operates in the same manner as described in the Background of the Invention section. The recombiner 36 also identifies the HDTV sequence based on the sequence header, and recombines the spatial luminance blocks output by the IDCT 34 with the spatial chroma blocks output by the down-converter 12 when the 4:2:0 or 4:2:2 sequence have been identified. Otherwise, when the 4:4:4 sequence has been identified, the recombiner 36 merely passes the output of the IDCT 36. The output of the recombiner 36 is an SDTV bitstream unless as discussed above, the HDTV signal was predictive or inter-coding encoded.

Figure 2:
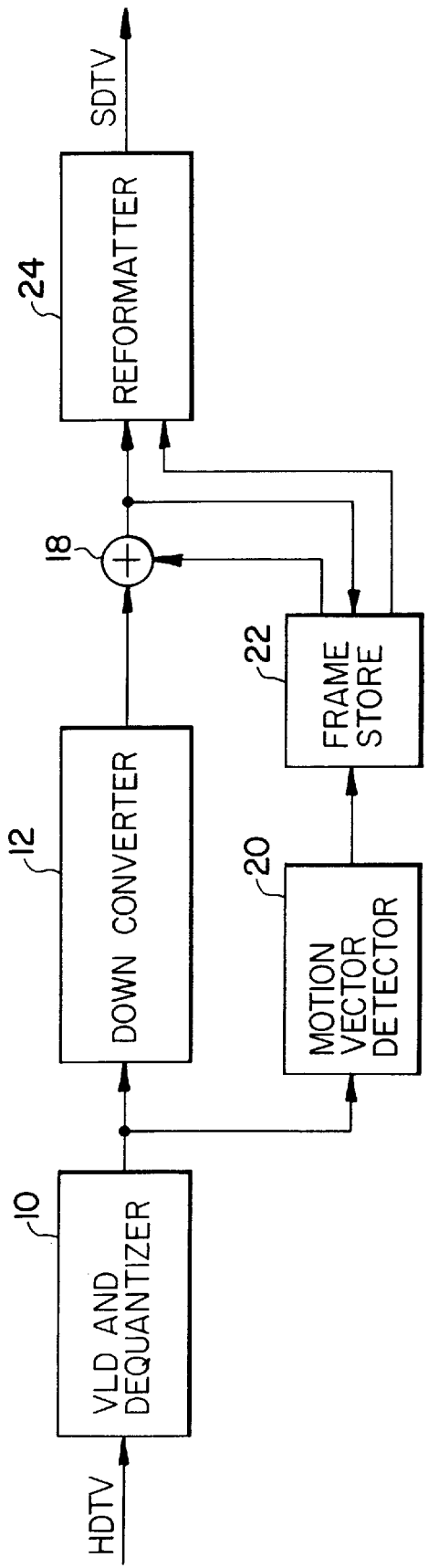
FIG. 2 illustrates another conventional apparatus for performing HDTV down-converting wherein filtering and down-sampling are performed in the DCT domain.
Figure 4:
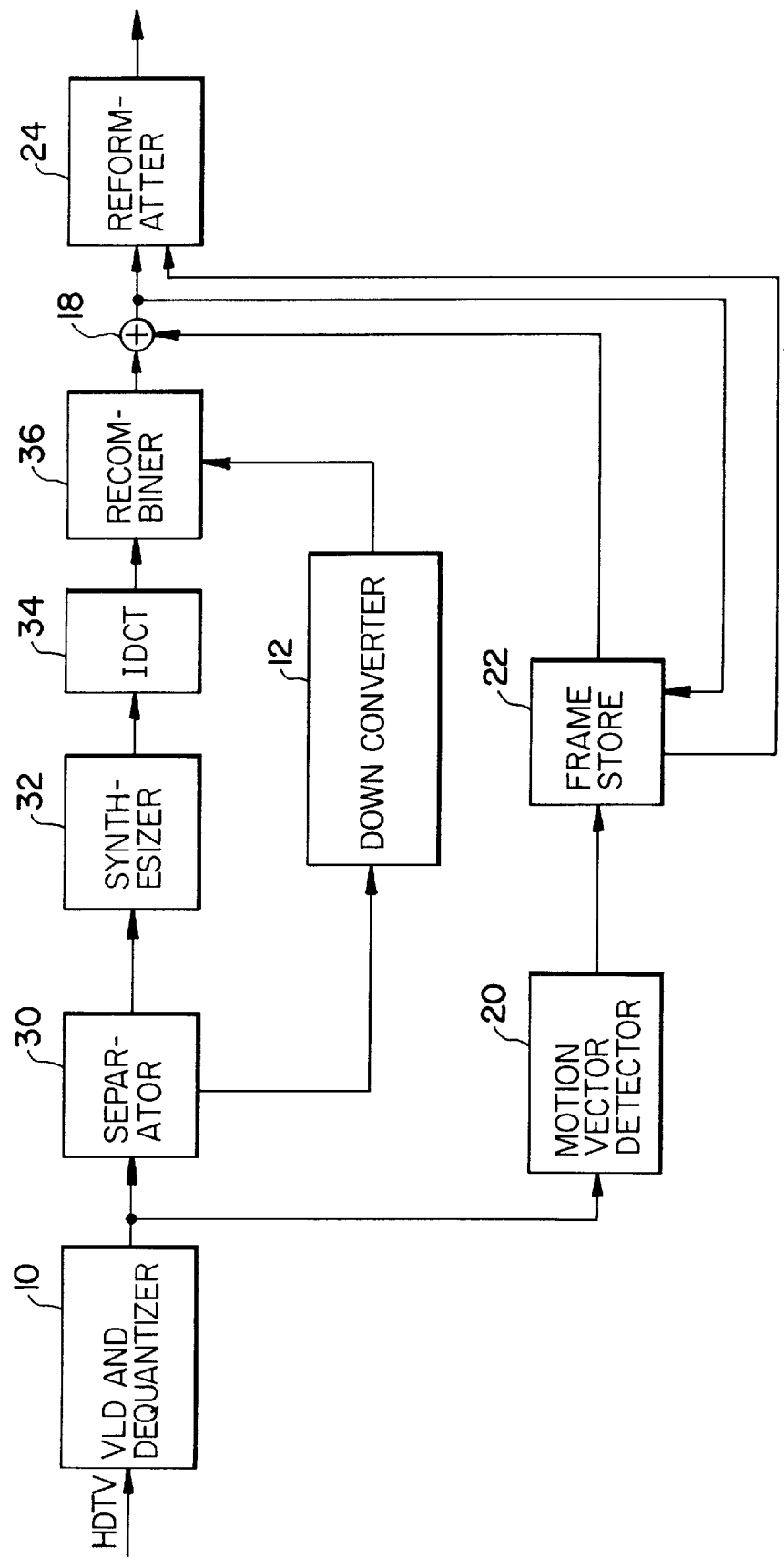
FIG. 4 illustrates another apparatus, according to the present invention, for performing HDTV down-converting wherein filtering and down-sampling are performed in the DCT domain.

If inter-coding was used, the output of the recombiner 36 will not represent spatial data in SDTV format. Accordingly, the adder 18, the motion vector detector 20, the frame store 22, and the reformatter 24 will have to be connected to the converting apparatus of FIG. 3 such as shown in FIG. 4. Specifically, the motion vector detector 20 is connected to receive the output of the VLD and dequantizer 10. The frame store 22 is connected to the output of the motion vector detector 20, and the adder 18 receives and adds the output of the recombiner 36 and the frame store 22. The frame store 22 also receives the output of the adder 18. The reformatter 24 is connected to both the adder 18 and the frame store 22, and outputs either the output from the adder 18 or a picture stored by the frame store 22. Since the operation of these additional components was described with respect to FIG. 2, that description will not be repeated.

As with the conventional art, once a digital signal in SDTV format is obtained, the SDTV signal can be converted to an NTSC signal using well-known techniques.

Computer simulations were run to compare the converter of the present invention with the prior art technique discussed above with respect to FIG. 1. Furthermore, a prior art technique wherein the HDTV decoded pictures are first filtered by a low-pass filter and then down-sampled by one-half in each dimension was used as a benchmark. In the computer simulations, an 1192×1080 interlaced HDTV sequence, "Whale", was used. The HDTV bitstream was generated by the MPEG standard video coding software with parameters of GOP size N=2, anchor frame distance M=3, bit rate equal to 18 Mbps, and 4:2:0 sequence. The simulation results showed that the prior art technique illustrated in FIG. 1 suffered from a significant amount of block edge effect and distortions due to poor approximation introduced by simply disregarding higher order coefficients (i.e., masking). The present invention, however, achieved significantly improved results over the prior art technique of FIG. 1. Additionally, the present invention provided improved processing speed, even faster than the benchmark.

While the present invention has been described with respect to specific coding sequences, it should be understood that the present invention is not limited to the coding sequences described. Additionally, the present invention is not restricted to use with a particular digital format such as MPEG. Instead, the present invention may be used with any format in any application where down-converting of digital data is desired.

Furthermore, while the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A method for down-converting a digital video signal, comprising:

receiving said digital video signal including at least first and second DCT blocks of DCT coefficients;

performing a frequency synthesizing operation on said first and second DCT blocks so as to generate a single synthesized DCT block having dimensions equal to said first and second DCT blocks to down-convert at least a portion of said digital video signal; and converting said synthesized DCT block from the DCT domain to the spatial domain to produce an output digital video signal.

2. The method of claim 1, wherein said first and second DCT blocks represent a luminance component of said digital video signal.

3. The method of claim 1, wherein said first and second DCT blocks represent a chroma component of said digital video signal.

4. The method of claim 1, wherein said receiving step receives an HDTV signal as said digital video signal.

5. The method of claim 1, wherein said receiving step receives said digital video signal including four DCT blocks representing a luminance data component of said digital video signal; and said synthesizing step synthesizes said four DCT blocks into a single synthesized DCT block having dimensions equal to said four DCT blocks.

6. The method of claim 5, wherein each of said four DCT blocks is a block of 8×8 DCT coefficients, and therefore, said synthesized DCT block is a block of 8×8 DCT coefficients.

7. The method of claim 1, wherein said receiving step receives said digital video signal which includes at least two luminance DCT blocks, representing a luminance component of said digital video signal, and at least two chroma DCT blocks, representing a chroma component of said digital video signal; and said synthesizing step synthesizes said two luminance DCT blocks into a single synthesized luminance DCT block having dimensions equal to said two luminance DCT blocks, and synthesizes said two chroma DCT blocks into a single synthesized chroma DCT block having dimensions equal to said two chroma DCT blocks; and said converting step converts said synthesized luminance and chroma DCT blocks from the DCT domain to the spatial domain to produce said output digital video signal.

8. The method of claim 7, wherein said receiving step receives said digital video signal which includes four luminance DCT blocks, representing a luminance component of said digital video signal, four first chroma DCT blocks, representing a first chroma component of said digital video signal, and four second chroma DCT blocks, representing a second chroma component of said digital video signal; and said synthesizing step synthesizes said four luminance DCT blocks into a single synthesized luminance DCT block having dimensions equal to said four luminance DCT blocks, synthesizes said four first chroma DCT blocks into a single synthesized first chroma DCT block having dimensions equal to said four first chroma DCT blocks, and synthesizes said four second chroma DCT blocks into a single synthesized second chroma DCT block having dimensions equal to said four second chroma DCT blocks; and said converting step converts said synthesized luminance, first chroma and second chroma DCT blocks from the DCT domain to the spatial domain to produce said output digital video signal.

9. The method of claim 1, wherein said synthesizing step low pass filters said first and second DCT blocks and combines said filtered first and second DCT blocks to produce said single synthesized DCT block.

10. The method of claim 9, wherein said synthesizing step performs said low pass filtering by only combining DCT coefficients of said first and second block representing components of said digital video signal below a certain frequency to produce said synthesized DCT block.

11. An apparatus for down-converting a digital video signal, comprising:

synthesizing means for receiving said digital video signal including at least first and second DCT blocks of DCT coefficients, and for performing, a frequency synthesizing operation on said first and second DCT blocks so as to generate a single synthesized DCT block having dimensions equal to said first and second DCT blocks to down-convert at least a portion of said digital video signal; and converting means for converting said synthesized DCT block from the DCT domain to the spatial domain to produce an output digital video signal.

12. The apparatus of claim 11, wherein said first and second DCT blocks represent a luminance component of said digital video signal.

13. The apparatus of claim 11, wherein said first and second DCT blocks represent a chroma component of said digital video signal.

14. The apparatus of claim 11, wherein said synthesizing means receives an HDTV signal as said digital video signal.

15. The apparatus of claim 11, wherein said synthesizing means receives said digital video signal including four DCT blocks representing a luminance data component of said digital video signal, and synthesizes said four DCT blocks into a single synthesized DCT block having dimensions equal to said four DCT blocks.

16. The apparatus of claim 15, wherein each of said four DCT blocks is a block of 8×8 DCT coefficients, and therefore, said synthesized DCT block is a block of 8×8 DCT coefficients.

17. The apparatus of claim 11, wherein said synthesizing means receives said digital video signal which includes at least two luminance DCT blocks, representing a luminance component of said digital video signal, and at least two chroma DCT blocks, representing a chroma component of said digital video signal, and synthesizes said two luminance DCT blocks into a single synthesized luminance DCT block having dimensions equal to said two luminance DCT blocks, and synthesizes said two chroma DCT blocks into a single synthesized chroma DCT block having dimensions equal to said two chroma DCT blocks; and said converting means converts said synthesized luminance and chroma DCT blocks from the DCT domain to the spatial domain to produce said output digital video signal.

18. The apparatus of claim 17, wherein said synthesizing means receives said digital video signal which includes four luminance DCT blocks, representing a luminance component of said digital video signal, four first chroma DCT blocks, representing a first chroma component of said digital video signal, and four second chroma DCT blocks, representing a second chroma component of said digital video signal, and synthesizes said four luminance DCT blocks into a single synthesized luminance DCT block having dimensions equal to said four luminance DCT blocks, synthesizes said four first chroma DCT blocks into a single synthesized first chroma DCT block having dimensions equal to said four first chroma DCT blocks, and synthesizes said four second chroma DCT blocks into a single synthesized second chroma DCT block having dimensions equal to said four second chroma DCT blocks; and said converting means converts said synthesized luminance, first chroma and second chroma DCT blocks from the DCT domain to the spatial domain to produce said output digital video signal.

19. The apparatus of claim 11, wherein said synthesizing means low pass filters said first and second DCT blocks and combines said filtered first and second DCT blocks to produce said single synthesized DCT block.

20. The apparatus of claim 19, wherein said synthesizing means performs said low pass filtering by only combining DCT coefficients of said first and second block representing components of said digital video signal below a certain frequency to produce said synthesized DCT block.

21. The apparatus of claim 11, wherein said synthesizing means and said converting means are a programmed microprocessor.

22. An apparatus for down-converting a digital video signal, comprising:

a synthesizer receiving said digital video signal including at least first and second DCT blocks of DCT coefficients, and performing a frequency synthesizing operation on said first and second DCT blocks so to generate a single synthesized DCT block having dimensions equal to said first and second DCT blocks to down-convert at least a portion of said digital video signal; and a converter converting said synthesized DCT block from the DCT domain to the spatial domain to produce an output digital video signal.

* * * * *